(12) United States Patent
Stewart

(10) Patent No.: US 9,047,260 B2
(45) Date of Patent: *Jun. 2, 2015

(54) MODEL-BASED TESTING OF A GRAPHICAL USER INTERFACE

(71) Applicant: International Business Machines Corporation, Armonk, NY (US)

(72) Inventor: James Clive Stewart, Evesham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,072

(22) Filed: Oct. 14, 2013

(65) Prior Publication Data
US 2014/0047276 A1    Feb. 13, 2014

Related U.S. Application Data

(63) Continuation of application No. 12/124,117, filed on May 20, 2008, now Pat. No. 8,595,559.

(30) Foreign Application Priority Data

Aug. 23, 2007   (EP) ..................................... 07114867

(51) Int. Cl.
G06F 11/00    (2006.01)
G06F 11/22    (2006.01)
G06F 11/36    (2006.01)

(52) U.S. Cl.
CPC ........ *G06F 11/2273* (2013.01); *G06F 11/3692* (2013.01)

(58) Field of Classification Search
CPC ............ G06F 11/3608; G06F 11/3604; G06F 11/362; G06F 11/3668
USPC .......... 714/37, 57, 38.1–38.14; 717/104, 105, 717/108, 125–127, 135
See application file for complete search history.

(56) References Cited

U.S. PATENT DOCUMENTS

| | | | |
|---|---|---|---|
| 5,799,193 A * | 8/1998 | Sherman et al. | ............... 717/105 |
| 2003/0202012 A1 | 10/2003 | Kemp | |
| 2004/0194054 A1 | 9/2004 | McGrath et al. | |
| 2006/0085681 A1 * | 4/2006 | Feldstein et al. | ................. 714/25 |

OTHER PUBLICATIONS

Dalal et al., "Model-Based Testing of a Highly Programmable System", Proceedings of ISSRE '98, Nov. 1998, pp. 174-178, IEEE Computer Society Press.
Landau et al., "Efficient String Matching in the Presence of Errors", 26th Annual Symposium on Foundations of Computer Science, Oct. 21-23, 1985, pp. 126-136.

* cited by examiner

*Primary Examiner* — Scott Baderman
*Assistant Examiner* — Jason Bryan
(74) *Attorney, Agent, or Firm* — Cantor Colburn LLP; Ingrid Foerester

(57) ABSTRACT

This invention provides a method, computer program and system for updating of a model of a system under test for use in model-based testing. In one embodiment, the system includes a rules engine, a comparator and a message dictionary. The rules engine runs an action against the system under test and runs the action against a model under test. The comparator compares an output from the system under test with a corresponding output from the model under test, wherein the output from the model under test is selected from one of a plurality of output message records. The dictionary engine updates the output message record by changing the message record if the output of the model under test is different from the output of the system under test. If the output message record is empty, the dictionary engine adds an output message record based on the system under test.

17 Claims, 3 Drawing Sheets

MODEL-BASED TESTING OF A GRAPHICAL USER INTERFACE

CROSS-REFERENCE TO RELATED APPLICATION

This application is a continuation of U.S. application Ser. No. 12/124,117 filed May 20, 2008, which claims priority under 35 U.S.C. §119 from European Patent Application No. 07114867.0 filed Aug. 23, 2007, the entire contents of which are incorporated herein by reference.

BACKGROUND

This invention relates to a method and apparatus for the creation of a model for use in model-based testing. In particular this relates to a method and apparatus for testing of a graphical user interface model using model-based testing.

An important aspect of designing an advanced computer software system is the ability to thoroughly test its implementation in order to assure that the Implementation complies with desired specifications. Usually, such verification requires the generation of test programs to verify that the system under test (SUT) behaves properly under a wide variety of circumstances.

Traditional software testing involves study of the SUT by the tester, who then writes and executes individual test scenarios that exercise the SUT. Testing may require validation of many functional levels, which substantially increases the complexity of the task. In the past, test scenarios were manually generated, but now this task is sometimes automated, using computer implemented test program generators.

Test program generators are sophisticated software engines that are used to create numerous test cases. By appropriate configuration, it is possible for test program generation either to be focused on very specific ranges of conditions, or to be broadened to cover a wide range of logic. Today, large numbers of test cases can be created in the time that a single test case could be written manually.

In the 1990s, model-based test program generators became popular in processor architectural design verification and software testing. Model-based test generation involves the generation of a suite of tests from a model under test (MUT). The MUT is derived from a specification of the SUT but not from the SUT itself. In many model-based testing situations, the behavior models are described by finite state machines (FSM). Such FSMs describe the possible states of the application and the transitions from state to state caused by operations or stimuli. Test programs generated from a MUT can cover different operation invocation patterns according to the testing goals.

One of the first model generators was the GOTCHA-TC-Beans Software Test Tool Kit, developed by International Business Machines Corporation (IBM), New Orchard Road, Armonk, N.Y. 10504. This tool provides a framework designed to assist testers in developing, executing and organizing function tests directed against Application Program Interfaces (APIS) and software protocols written in Java™, C or C++. Another tool used for model-based testing and model creation is IBM Rational Functional Tester.

Model-based testing of a SUT graphical user interface (GUI) focuses on exercising user controls in a GUI and the GUI produces messages to confirm success or indicate errors. These messages are: extensive; numerous; and prone to change during development of the SUT. Finding instances of all the messages in all GUI pages can be expensive and time consuming because of the sheer number of the messages. There may be hundreds of pages in a GUI and tens of possible messages per page, requiring many combinations of data and operations to elicit them. Often GUI messages are described during the last part of the development process and are continually updated during testing. A complete model of the SUT GUI would need constant updating and therefore it has been impractical to build and maintain such a model up till now.

SUMMARY

According to one embodiment of the present invention, a method comprises: running an action against a system under test; running the action against a model under test; comparing corresponding outputs from the system under test with outputs from the model under test, wherein the output of the model under test is selected from one of a plurality of output message records; and updating the output message record by changing the output message record if the output of the model under test is different from the output of the system under test.

According to another embodiment of the present invention, a system comprises: a rules engine for running an action against a system under test and for running the action against a model under test; a comparator for comparing an output from the system under test with a corresponding output from the model under test, wherein the output from the model under test is selected from one of a plurality of output message records; and a dictionary engine for updating the output message record by changing the output message record if the output of the model under test is different from the output of the system under test.

According to an additional embodiment of the present invention, a computer program product comprises computer readable recording medium having computer readable code stored thereon for updating of a model of a system under test for use in model-based testing, the computer readable code which, when loaded onto a computer system and executed, performs the following steps: running an action against a system under test and running the action against a model under test; comparing an outputs from the system under test with a corresponding output from the model under test, wherein the output of the model under test is selected from one of a plurality of output message records; and updating the output message record by changing the output message record if the output of the model under test is different from the output of the system under test.

DETAILED DESCRIPTION

Figure 1:
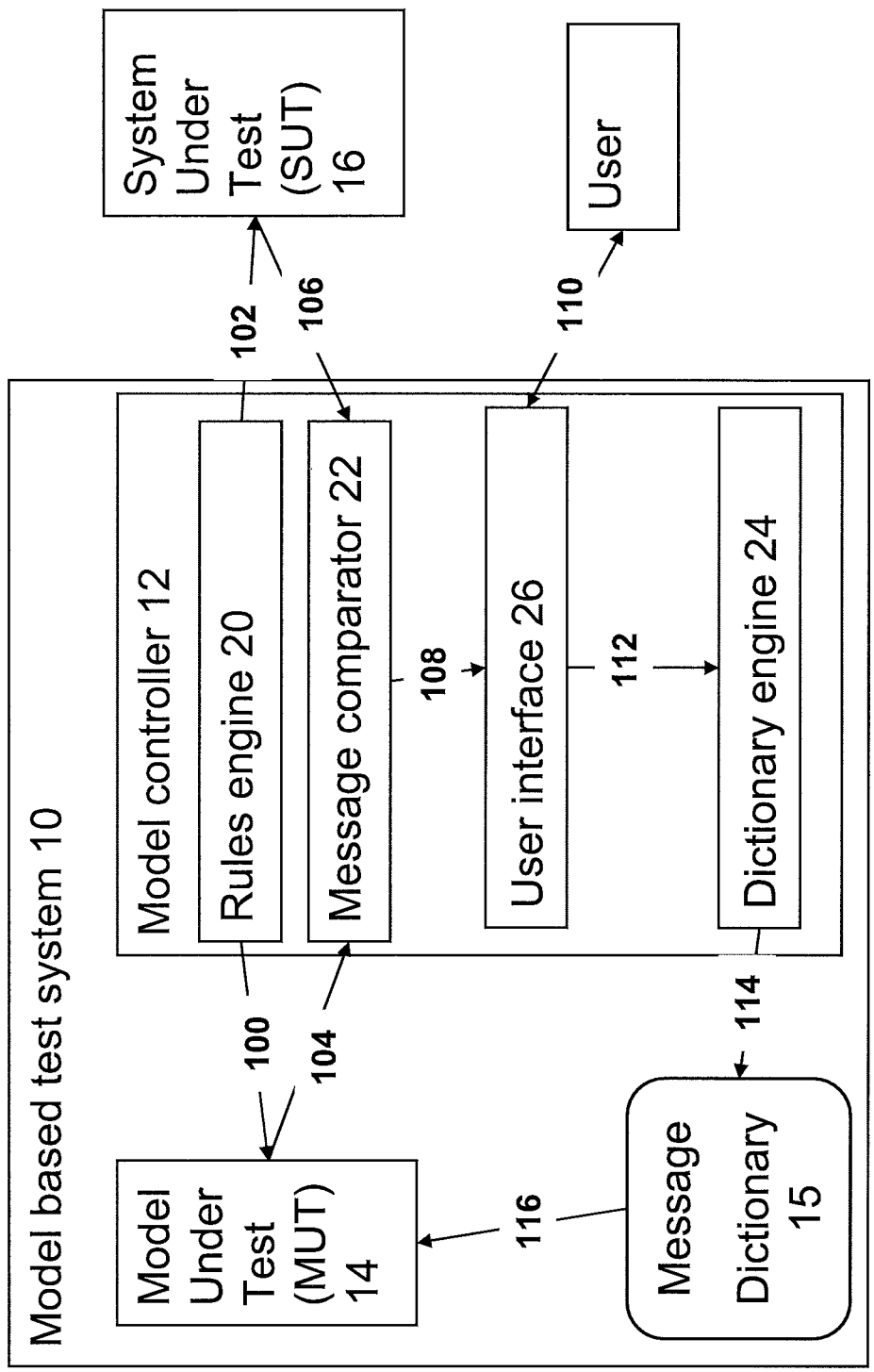
FIG. 1 is a schematic of a model-based test system.

According to an embodiment of the present invention there is provided a method for updating of a model of a system under test for use in model-based testing. The method includes running an action against both the system under test and the model, comparing the output of the system under test and the output of the model and updating the model-based on the comparison.

The output of the model is defined in a configurable list of output messages that can be updated, or added to, or deleted from. In this specification, the system under test is referred to as a SUT and the model of the system under test is referred to either as a model, a model under test or MUT. The updating of the model is performed by mechanisms that update the configurable list based on the comparison of the output of the system under test and the output of the model under test.

The output of the model is not always exactly the same as the system under test since the user is not testing the output messages and there are some advantages in having slightly different output so that the user can recognize changes made to the model output. If comparison of two non-matching test results is within a threshold, then the model is not updated or the option is given to the tester to not update the model. Furthermore if the outputs are different and the tester has previously agreed to the difference then the model is not updated. The model stores a mapping of the SUT message to the model message when a user has accepted particular mappings.

Message mapping makes checking, subsequent testing, and maintenance of the models message data simpler and less labor intensive. This solution is applicable to the task of performing model-based testing on a GUI but the same solution may also be used for other types of interfaces and applications under test. Manually checking a file to compare all the similar messages is faster and takes less effort than using all the GUI operations to discover all the messages. Subsequently checking only those messages which are discovered to have changed saves tester time.

The invention is particularly useful for testing a system for other languages since multiple mappings can be maintained for the different languages, or optionally the translations can be checked by looking up in a translated resource bundle from the product under test. It is then possible to manually or automatically compare the results from the translated and non-translated operation to find any messages which are missing or not translated.

Using the techniques of the invention, the model can be developed in isolation while the real GUI is under development and the messages can be gathered dynamically during the testing process. Without using this technique, a model-based GUI test is very expensive and difficult to maintain. Similar methods can be used with model-based testing of programmer interfaces (API's) where the model and the interface should both throw exceptions. A lookup list can be used to compare the modeled exception messages with the exceptions thrown by the 'real' API.

The present embodiment is realized in the model-based test system 10 of FIG. 1. The model-based test system 10 comprises: model controller 12; a model under test (MUT) 14 and a message dictionary 15. The model-based test system 10 tests the interfaces of system under test (SUT) 16.

The SUT 16 is any system under test that can receive actions 102 and output messages 106 including the user output messages.

Figure 2A:
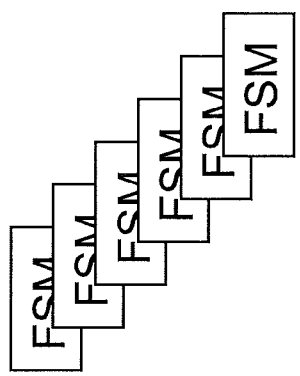
FIG. 2A shows a model of the model-based test system in more detail.

The MUT 14 comprises a plurality of finite state machines configured to model the SUT (see also FIG. 2A). The message dictionary 15 is only loosely integrated into the MUT 14 so that it can be configured by the model controller 12.

Figure 2B:
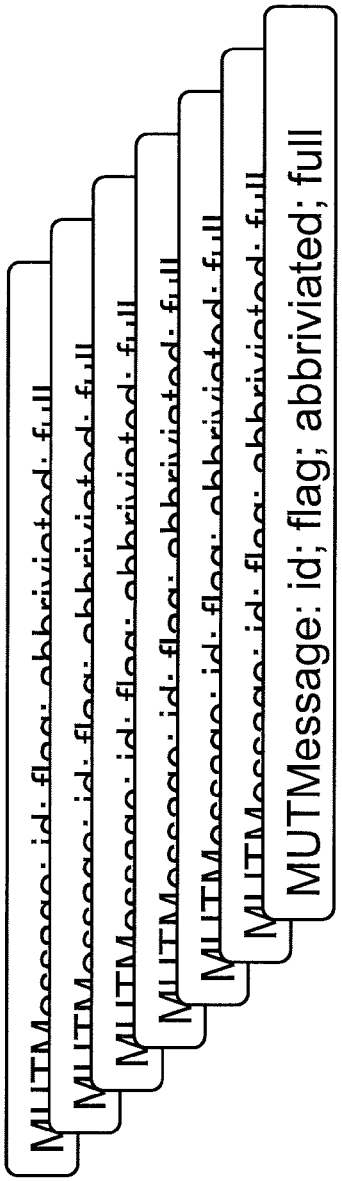
FIG. 2B shows a message dictionary of the model-based test system in more detail.

Message dictionary 15 comprises a record for each user message that has been recorded in the message dictionary 15 (See also FIG. 2B). Each record comprises a field for: the MUT message id; a confirmation flag field; an abbreviated MUT message; and a long SUT message. The confirmation flag field is for marking each record as confirmed where the differences between the long MUT message and the SUT message are above a threshold but the user has confirmed that they are similar enough. It will be appreciated by those skilled in the art that message dictionary 15 may also be referred to as a mapping.

Model controller 12 comprises: rules engine 20; message comparator 22; dictionary engine 24; and user interface 26.

Rules engine 20 generates actions 100 and 102 for testing the SUT and MUT using a database of actions and data with a randomizer. In addition to the randomizer, User input might select which rules and data are used to test the SUT and MUT. Each action is sent simultaneously as input 100 to the SUT and input 102 to the MUT so that the corresponding output 104 and 106 from the SUT and MUT can be compared.

Message comparator 22 matches corresponding outputs 104 and 106 from the SUT and MUT resulting from a particular action and then compares the two. At least three scenarios can occur. Firstly, if there is a match then a cycle is started whereby further actions are generated by the rules engine and compared in the message comparator. Secondly, if a MUT message has no corresponding SUT message then the MUT message needs to be removed from the model and in this case a remove request 108 is made to remove the MUT message from the message dictionary 15. Thirdly, if a SUT message has no corresponding MUT message then an add request 108 is made to add both messages to the message dictionary 15. Fourthly, if a SUT message does not match that previously stored against the MUT message then the default action is to send an update request 108 to update the message dictionary 15 with the new SUT message.

However, in this fourth scenario, if the mismatch has been accepted by a user then no request is made to change the message dictionary 15. Also in this fourth scenario, if the mismatch between a SUT message and a MUT message is below a threshold then no update request 108 is sent. In the preferred embodiment the closeness of the match of the SUT and MUT message is a comparison of the number of MUT message characters that are contained in the SUT message and the default threshold is 50% of MUT message characters appearing in the SUT message.

The user interface 26 logs all the activity of the message comparator 22 and the dictionary engine 24. In a preferred embodiment user interface 26 receives all the requests 108 from the message comparator 22 and compiles them into a request list for display to the user. In the preferred embodiment the user interface accepts user input to accept or decline each request and the user may also select a group of requests and accept or decline each request in the group.

The dictionary engine 24 makes changes to the message dictionary 15 when it receives requests 112. In the preferred embodiment a group of requests 108 are received from the user interface 26 after a user has selected or confirmed requests from a batch of requests. This is preferred because it enables a user to review the requests in one go and make batch decision in the context of all the requests. The dictionary engine 24 updates the message dictionary 15 when it receives an update request 112 from the message comparator or the user interface. The dictionary engine 24 removes a message from the message dictionary 15 when it receives a remove request from the message comparator or the user interface. The dictionary engine 24 updates a message from the message dictionary 15 when it receives an update message 112 from the message comparator or the user interface.

Some SUT messages are compound messages with variable strings such as file names or types, for instance, "The document basic.xml was successfully deleted" where basic.xml is the variable string. Where a model is does not simulate this part then the string is filtered out of the MUT message, replacing it with <filename> or <type> as appropriate. In this case the message "The document <filename> was successfully deleted" is stored rather. In an alternative embodiment, where there are a limited number of options, the model produces messages with the option names in; for example, the model might produce two messages: "WSDL document stored OK"; "XML document stored OK".

In a second embodiment, the user interface outputs each request as it arises to the user to accept or decline individually.

In a third embodiment, requests 108 are sent directly from the message comparator 22 to the dictionary engine 24 without being intercepted by a user interface and the user may check the results at a later time.

Figure 3:
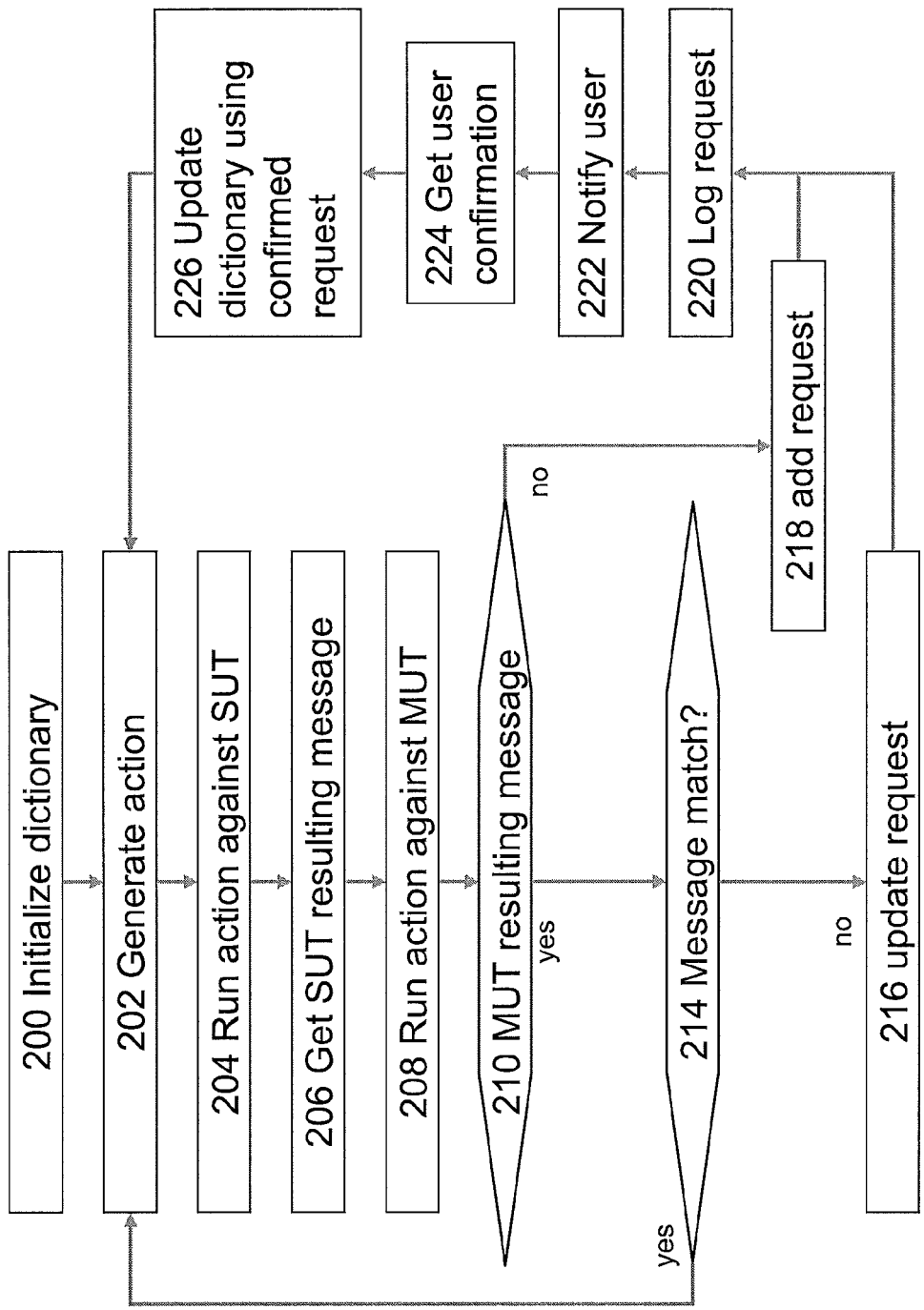
FIG. 3 is a schematic of the main method of the model-based test system.

An additional embodiment will now be described in terms of a method as shown in FIG. 3. In the first step, step 200, the message dictionary 15 is initialized by an initial run of test actions run against the SUT. Each resulting SUT message is made into a request for addition to the message dictionary 15 along with a corresponding MUT message which may be abbreviated or may be the same as the SUT message. Requests for additions to the message dictionary 15 are performed or reviewed manually before being performed. In this way the message dictionary 15 is initially populated with SUT messages.

In step 202, the model controller generates an action for testing the SUT. The mechanism for generating the action is based on random input and user input. Such mechanisms are well known in the field of model-based testing and not discussed in detail here.

In step 204, the model controller runs the action against the SUT.

In step 206, the model controller gets the resulting SUT message.

In step 208, the model controller runs the same action against the MUT.

In step 210, the model controller gets the resulting MUT message from the MUT and moves on to step 214. However, if the MUT message is not in the message dictionary 15 then a message needs to be added and the process moves to step 218.

In step 214, the model controller looks at the comparison between that found in the message dictionary 15 matching the MUT message and the SUT message resulting from the test action. If both messages match within a pre-determined threshold then in the preferred embodiment a cycle starts at the generate action step 202 because there is no need to change the message dictionary 15. In other embodiments the user interface logs the match. The message comparator measures the closeness of the match of the resulting SUT and that retrieved by using the MUT.

In step 216, an update request is sent to the user interface to update the looked up MUT message with the resulting SUT message.

In step 218, an add request is sent to the user interface so that the SUT message can be added to the message dictionary 15.

In step 220, the user interface logs all the activity of the message comparator 22 and the dictionary engine 24.

In step 222, the user interface 26 notifies the user of the requests by displaying them in the list.

In step 224, the user interface accepts user input to accept or decline each request in the list.

In step 226, the message dictionary 15 is updated with a confirmed add request to add a resulting MUT and SUT messages or updated with a confirmed update request to update the message dictionary 15. The cycle continues at the generate action step 202.

In the preferred embodiment this MUT message is located in the message dictionary 15, but in other embodiments the MUT may generate MUT message independently and the message dictionary 15 is independent of the MUT 14.

The following example will illustrate the embodiments. Model-based testing works by randomly selecting and operations and executing them on both a system under test (SUT) and a model under test (MUT) and then comparing results. The MUT should behave in the same way as the SUT and differences indicate errors in specification, model, or system under test. Since the model is built to produce simple readable message as a result of each operation the model might actually output an abbreviated MUT message "file loaded OK" to the user whereas the full MUT message is "The document was loaded successfully."

The message dictionary 15 code looks like:

| MUT Message | Confirmation Flag | Abbreviated Message | Full Message |
|---|---|---|---|
| 1 | 0 | 'loadFile file loaded OK' | 'The document was loaded successfully.' |
| 2 | 0 | 'loadFile file already Loaded ERR' | 'Error: the document is already in the registry.' |
| 3 | 1 | 'loadFile file invalid document ERR' | 'A document must be specified.' |

In response to a series of actions the following SUT and MUT messages are produced.

| Action | SUT Message | MUT Message |
|---|---|---|
| 1 | 'The document was loaded successfully.' | 1; 'The document was loaded successfully.' |
| 2 | 'A valid document name must be specified.' | 3; 'A document name must be specified.' |
| 3 | ' ' | 2; 'Error: the document is already in the registry.' |
| 4 | 'Not authorized to perform that action' | 4; ' ' |

For action 1 the messages are the same and no change is needed.

For action 2 the difference between the SUT message and the MUT message 3 is the word "valid". In action 2 the difference of the word valid between the message is deemed enough to trigger a change. In other examples the threshold for change can be set higher and the difference would be ignored.

For action 3, there is no corresponding SUT message for MUT message 2 and MUT message 4 should be removed.

For action 4, there is no corresponding MUT message and one needs to be created.

The user interface receives the following messages in respect of action 2 to 4 and the user can select which changes are to be performed in the right hand column of the table. In this example all changes are selected.

| Change | Change message Select | Select |
|---|---|---|
| 1 | MUT message should be updated to 'A valid document must be specified.' X | X |
| 2 | MUT message should be created X | X |
| 3 | MUT message should be updated to 'Not authorized to perform that action' X | X |

The dictionary engine 24 makes the following changes based on the changes selected above; the changes are underlined for insertions and struck through for deletions.

| MUT Message | Confirmation Flag | Abbreviated Message | Full Message |
|---|---|---|---|
| 1 | 0 | 'loadFile file loaded OK' | 'The document was loaded successfully.' |
| 2 | 0 | 'loadFile file already Loaded ERR' | 'Error: the document is already in the registry.' |
| 3 | 1 | 'loadFile file invalid document ERR' | 'A valid document must be specified.' |
| 4 | 0 | 'Not authorized to perform that action' | 'Not authorized to perform that action' |

It will be clear to one skilled in the art that the method of the present invention may suitably be embodied in a logic apparatus comprising logic means to perform the steps of the method, and that such logic means may comprise hardware components or firmware components. For instance, FIG. 1 shows a logic embodiment. It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave.

The invention claimed is:

1. A method comprising:
generating an action for testing a system under test;
receiving a resultant system output message from the system under test;
running the action against a model under test, the model under test configured to model the system under test;
determining whether a resultant model output message from the model under test corresponding to the action is present in a message dictionary;
sending an add request to a user interface as a request responsive to determining that the resultant model output message from the model under test is not present in the message dictionary;
sending an update request to the user interface as the request based on determining that a number of differences between a previously stored model output message in a record of the message dictionary and the resultant system output message are greater than a threshold value;
determining whether a user has entered an input indicating a confirmation of the request; and
updating the message dictionary responsive to receiving the input indicating the confirmation of the request, wherein the record of the message dictionary is marked as confirmed based on determining that the number of differences between the previously stored model output message in the record and the resultant system output message are greater than the threshold value, and the user has confirmed that the previously stored model output message and the resultant system output message are sufficiently similar.

2. The method of claim 1, wherein the updating the message dictionary includes updating the message dictionary with the resultant system output message from the system under test in response to the confirmation of the update request.

3. The method of claim 2, wherein the message dictionary includes a record of user messages that have been recorded in the message dictionary.

4. The method of claim 2, wherein the message dictionary includes a plurality of records.

5. The method of claim 4, wherein a record of the plurality of records includes:
a model under test message identifier field;
a confirmation flag field;
an abbreviated model under test message field; and
a long system under test message field.

6. The method of claim 5, wherein the confirmation flag field is operative to mark the record as confirmed.

7. A system comprising a logic apparatus operative to:
generate an action via a microprocessor for testing a system under test, run the action via the microprocessor against the system under test, receive a resultant system output message from the system under test, run the action against a model under test, wherein the model under test is configured to model the system under test, determine via the microprocessor whether a resultant model output message from the model under test corresponding to the action is present in a message dictionary, send an add request via the microprocessor to a user interface as a request responsive to determining that the resultant model output message from the model under test is not present in the message dictionary, send an update request to the user interface as the request based on determining that a number of differences between a previously stored model output message in a record of the message dictionary and the resultant system output message are greater than a threshold value, determine via the microprocessor whether a user has entered an input indicating a confirmation of the request, and updating the message dictionary via a dictionary engine controlled by via the microprocessor responsive to receiving the input indicating the confirmation of the request, wherein the record of the message dictionary is marked as confirmed based on determining that the number of differences between the previously stored model output message in the record and the resultant system output message are greater than the threshold value, and the user has confirmed that the previously stored model output message and the resultant system output message are sufficiently similar.

8. The system of claim 7, wherein the logic apparatus updates the message dictionary with the resultant system output message from the system under test in response to the confirmation of the update request.

9. The system of claim 8, wherein the message dictionary includes a record of user messages that have been recorded in the message dictionary.

10. The system of claim 8, wherein the message dictionary includes a plurality of records.

11. The system of claim 10, wherein a record of the plurality of records includes:
   a model under test message identifier field;
   a confirmation flag field;
   an abbreviated model under test message field; and
   a long system under test message field.

12. The system of claim 11, wherein the confirmation flag field is operative to mark the record as confirmed.

13. A computer program product comprising a non-transitory computer readable recording medium having computer readable code stored thereon for updating a model of a system under test for use in model-based testing, said computer readable code which, when loaded onto a computer system and executed, performs the following steps:
   running an action against the system under test;
   receiving a resultant system output message from the system under test;
   running the action against a model under test, wherein the model under test is configured to model the system under test;
   determining whether a resultant model output message from the model under test corresponding to the action is present in a message dictionary;
   sending an add request to a user interface as a request responsive to determining that the resultant model output message from the model under test is not present in the message dictionary;
   sending an update request to the user interface as the request based on determining that a number of differences between a previously stored model output message in a record of the message dictionary and the resultant system output message are greater than a threshold value;
   determining whether a user has entered an input indicating a confirmation of the request; and
   updating the message dictionary responsive to receiving the input indicating the confirmation of the request, wherein the record of the message dictionary is marked as confirmed based on determining that the number of differences between the previously stored model output message in the record and the resultant system output message are greater than the threshold value, and the user has confirmed that the previously stored model output message and the resultant system output message are sufficiently similar.

14. The computer program product of claim 13, wherein the method further comprises updating the message dictionary with the resultant system output message from the system under test in response to the confirmation of the update request.

15. The computer program product of claim 14, wherein the message dictionary includes a record of user messages that have been recorded in the message dictionary.

16. The computer program product of claim 14, wherein the message dictionary includes a plurality of records and a record of the plurality of records includes:
   a model under test message identifier field;
   a confirmation flag field;
   an abbreviated model under test message field; and
   a long system under test message field.

17. The computer program product of claim 16, wherein the confirmation flag field is operative to mark the record as confirmed.

* * * * *